US010838977B2

(12) United States Patent
Ben-Romdhane et al.

(10) Patent No.: US 10,838,977 B2
(45) Date of Patent: Nov. 17, 2020

(54) KEY-VALUE REPLICATION WITH CONSENSUS PROTOCOL

(71) Applicant: eBay Inc., San Jose, CA (US)

(72) Inventors: Sami Ben-Romdhane, Los Altos, CA (US); Jungsang Ahn, San Jose, CA (US); Guogen Zhang, San Jose, CA (US)

(73) Assignee: eBay Inc., San Jose, CA (US)

( * ) Notice: Subject to any disclaimer, the term of this patent is extended or adjusted under 35 U.S.C. 154(b) by 192 days.

(21) Appl. No.: 16/015,416

(22) Filed: Jun. 22, 2018

(65) Prior Publication Data
US 2019/0392072 A1 Dec. 26, 2019

(51) Int. Cl.
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
None
See application file for complete search history.

(56) References Cited

U.S. PATENT DOCUMENTS

| 6,748,381 | B1 | 6/2004 | Chao et al. |
| 7,647,329 | B1 | 1/2010 | Fischman et al. |
| 7,739,240 | B2 | 6/2010 | Saito et al. |
| 8,176,012 | B1 | 5/2012 | Rabii et al. |
| 8,554,762 | B1* | 10/2013 | O'Neill .................. G06F 16/27 707/715 |
| 8,856,593 | B2 | 10/2014 | Eckhardt et al. |
| 9,231,988 | B2 | 1/2016 | Holt et al. |
| 2014/0344425 | A1* | 11/2014 | Varney ............... H04L 41/0813 709/221 |
| 2016/0203202 | A1 | 7/2016 | Merriman et al. |
| 2017/0032007 | A1 | 2/2017 | Merriman |
| 2017/0046378 | A1* | 2/2017 | Quin ...................... G06F 16/21 |
| 2018/0173745 | A1* | 6/2018 | Balasubramanian ....................... G06F 16/2336 |
| 2018/0314726 | A1* | 11/2018 | Bath .................. G06F 16/2365 |
| 2018/0329967 | A1* | 11/2018 | Lee .................... G06F 16/2228 |
| 2019/0305959 | A1* | 10/2019 | Reddy .................. H04L 9/3247 |

OTHER PUBLICATIONS

"Administration Console Online Help Configure cross-cluster replication", (Accessed Apr. 10, 2018), 2 pages.

* cited by examiner

*Primary Examiner* — Wilson Lee
(74) *Attorney, Agent, or Firm* — SBMC

(57) ABSTRACT

A replicated key-value store is implemented using a "last-write-wins" consensus protocol. To improve throughput and latency in cross-data-center configurations, a system deploys a cross-cluster, learner-only member to a cluster of nodes (e.g., a data center). The cross-cluster, learner-only member submits key-values received at local leader members to remote clusters. Conflicts between the key-values and initial values at the remote clusters are resolved using a "last-write-wins" consensus protocol.

20 Claims, 7 Drawing Sheets

KEY-VALUE REPLICATION WITH CONSENSUS PROTOCOL

TECHNICAL FIELD

The subject matter of the present disclosure generally relates methods and systems supporting distributed computing.

BACKGROUND

A distributed computer system includes software components located on multiple computers coupled to a network and which communicate and coordinate actions by passing messages to each other over the network. Each networked computer or node generally has its own memory and local data store.

Key-value stores are an effective way to manage data within distributed computer systems, as they are not based on relational tables and structured query languages. A key-value store is a data storage paradigm designed for storing, retrieving, and managing associative arrays. Therefore, a key-value store is effectively a large dictionary that contains a collection of objects and records, which in turn have different fields within them, each containing data. These records are stored and retrieved using a key that uniquely identifies the record and may be used to find the data within the database. Providing the key-value store with a key therefore allows the update or return of a value, where the value can be data of almost any type, thus making the key-value store adaptable to a variety of applications.

Key-value stores often employ various different types of consistency models in order to ensure that memory across the distributed system will remain consistent, and the results of reading, writing, or updating will be predictable and uniform. Typical consistency models employed on key-value stores include ad hoc methods which lead to less predictable levels of memory consistency across the distributed system.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
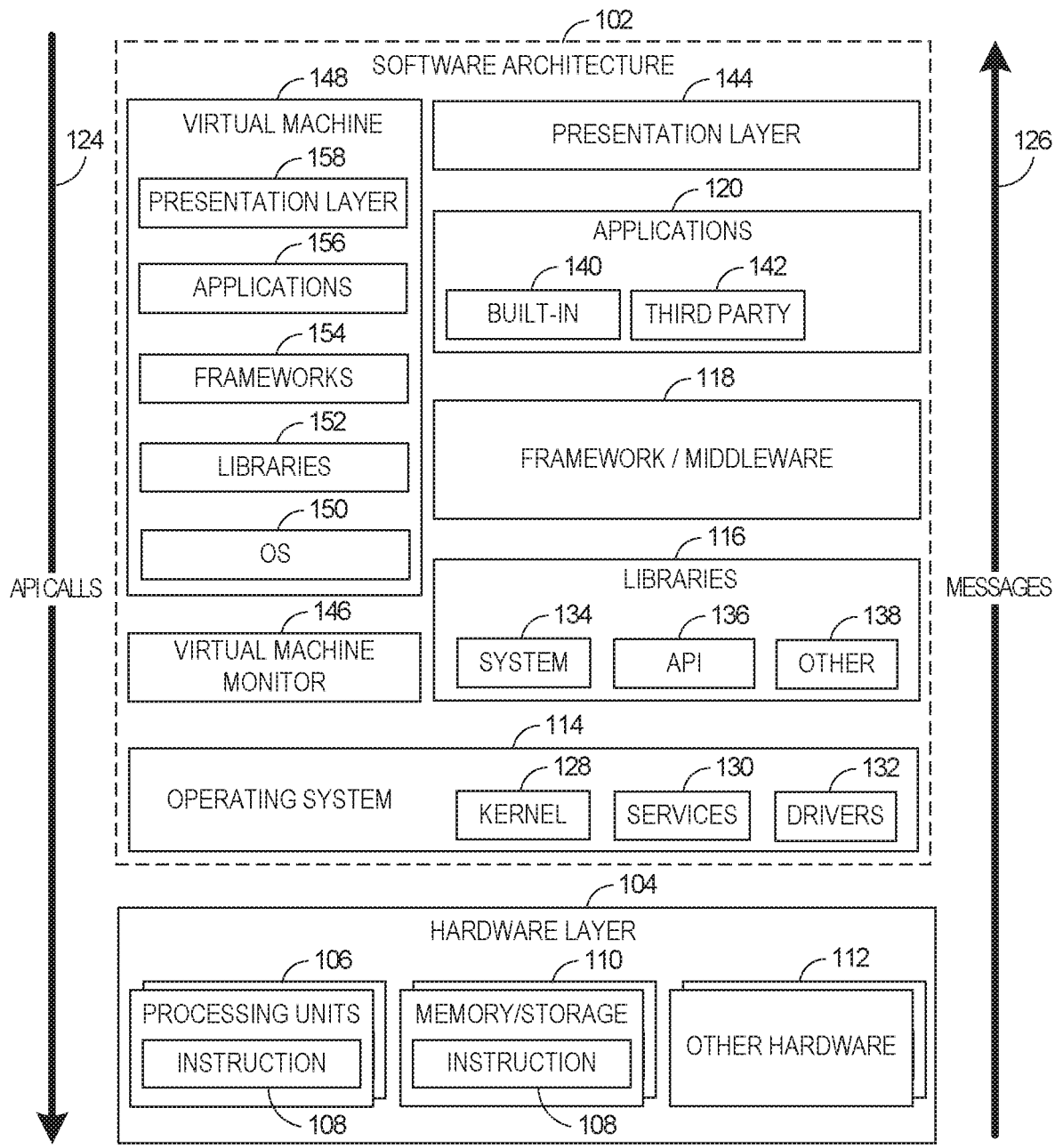
FIG. 1 is a block diagram illustrating an example of a software architecture that may be installed on a machine, according to some example embodiments.

Traditional "eventually consistent key-value stores" employ ad hoc methodologies that lead to less predictable levels of consistency among replicas. It is therefore desirable to employ new and novel consistency models based on proven consensus protocols that can guarantee consistency within memory of a distributed computer system, while also providing cross-data-center multi master active-active capability, by extending a consensus protocol with conflict resolution. Example embodiments, therefore, provide systems and methods for performing key-value store replication based on consensus protocols.

"Consensus" is the process of agreeing on a single value among a group of participants. Consensus protocols are the basis for the state machine replication approach to distributed computing. A state machine is an abstract machine that can be in exactly one of a finite number of states at any given time, and which can change from one state to another in response to some external input. As an illustrative example, consider that a state machine comprises a collection of processes which can each propose values. Consensus protocols ensure that a single one of the proposed values is chosen.

A replicated key-value store (KV store) is implemented for cross-cluster replication within a data center using a "last-write-wins" consensus protocol. To improve throughput and latency in cross-data-center configurations, a system deploys a cross-cluster, learner-only member to a cluster of nodes a data (e.g., a data center). A learner-only member acts as a replication factor for the consensus protocol. As discussed herein, a "cross-cluster" member is a node configured to act as a federated client across multiple node clusters, and which may submit replicated values received from a local leader member to a remote leader member of a remote cluster. A leader member receives commands (e.g., key-value operations), and passes the commands to the cross-cluster, learner-only member (as the cross-cluster learner-only member may not itself receive commands directly). The cross-cluster, learner only member replicates key-values received at local leader members, and submits the replicated key-values to remote clusters. Conflicts between the key-values and initial values at the remote clusters are resolved using a "last-write-wins" consensus protocol. Because every cluster applies the same conflict resolution policy, the clusters will all eventually achieve consistency.

Example embodiments described herein disclose a cross-cluster replication system (e.g., in a distributed computing system), configured to allocate a cross-cluster member to a first cluster of nodes, wherein the first cluster of nodes comprises a first set of member nodes, and a first leader member, wherein the first leader member is configured to receive write requests for the cluster of nodes. Key-values are received in a packet at the first leader member, and attributes of the packet are tracked and recorded. Embodiments discussed herein may be extended to cross-cluster replication within a data center. For example, the attributes of the packet may include a source of the packet, as well as a timestamp indicating a time in which the packet was generated or transmitted to the first leader member. In response to receiving the packet at the first leader member, the first leader member replicates the key-value of the packet to a cross-cluster member within the first cluster of nodes.

The cross-cluster member submits the replicated key-value to a second leader member of a second cluster of nodes, wherein the second cluster of nodes is remote from the first cluster of nodes. The second leader member replicates the key-value to a second set of member nodes of the second cluster of nodes.

In some example embodiments, the cross-cluster member allocated to the cluster of nodes may be located externally to the cluster of nodes, for example within the second cluster of nodes. In further embodiments, the cross-cluster member allocated to the cluster of nodes may be within the local cluster itself.

In some example embodiments, in response to submitting the replicated key-value to the second leader member of the second cluster of nodes, a conflict between the replicated key-value and an initial key-value of the second leader member is detected. In response to detecting the conflict, the cross-cluster replication system applies a conflict resolution protocol to identify a winner between the conflicting values. In response to identifying the winner, the winning value is replicated to the second leader member, which then replicates the winning value to the second set of member nodes of the second cluster of nodes.

In some example embodiments, the conflict resolution protocol includes a "last-write-wins" rule, wherein a value with a most recent timestamp is the winning value. In such embodiments, in response to detecting the conflict between the initial value of the second leader member and the replicated key-value of the cross-cluster member, timestamps of the values are retrieved and compared to identify the most recent value.

In some embodiments, each cluster of nodes includes clocks which are synchronized with one another to ensure that the timestamps are accurate relative to one another. In further embodiments, the cluster of nodes may all share a single shared clock that maintains and provides timestamps to the clusters of nodes remotely.

FIG. 1 is a block diagram illustrating an example of a software architecture that may be installed on a machine, according to some example embodiments. FIG. 1 is merely a non-limiting example of a software architecture, and it will be appreciated that many other architectures may be implemented to facilitate the functionality described herein. The software architecture 102 may be executing on hardware such as a machine 900 of FIG. 9 that includes, among other things, processors 910, memory 930, and I/O components 950. A representative hardware layer 104 is illustrated and can represent, for example, the machine 900 of FIG. 9. The representative hardware layer 104 comprises one or more processing units 106 having associated executable instructions 108. The executable instructions 108 represent the executable instructions of the software architecture 102, including implementation of the methods, modules, and so forth of FIGS. 2-6. The hardware layer 104 also includes memory or storage modules 110, which also have the executable instructions 108. The hardware layer 104 may also comprise other hardware 112, which represents any other hardware of the hardware layer 104, such as the other hardware illustrated as part of the machine 900.

In the example architecture of FIG. 1, the software architecture 102 is conceptualized as a stack of layers, where each layer provides particular functionality. For example, the software architecture 102 includes layers such as an operating system 114, libraries 116, framework/middleware 118, applications 120, and a presentation layer 1044. Operationally, the applications 120 or other components within the layers invoke API calls 124 through the software stack and receive a response, returned values, and so forth (illustrated as messages 126) in response to the API calls 124. The layers illustrated are representative in nature, and not all software architectures have all layers. For example, some mobile or special purpose operating systems may not provide a frameworks/middleware 118 layer, while others may provide such a layer. Other software architectures may include additional or different layers.

The operating system 114 manages hardware resources and provides common services. The operating system 114 may include, for example, a kernel 128, services 130, and drivers 132. The kernel 128 acts as an abstraction layer between the hardware and the other software layers. For example, the kernel 128 may be responsible for memory management, processor management (e.g., scheduling), component management, networking, security settings, and so on. The services 130 provide other common services for the other software layers. The drivers 132 are responsible for controlling or interfacing with the underlying hardware. For instance, the drivers 132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 116 provide a common infrastructure that may be utilized by the applications 120 and/or other components and/or layers. The libraries 116 typically provide functionality that allow other software modules to perform tasks in an easier fashion than by interfacing directly with the underlying operating system 114 functionality (e.g., the kernel 128, services 130, or drivers 132). The libraries 116 may include system libraries 134 (e.g., C standard library) that may provide functions such as memory allocation functions, string manipulation functions, mathematic functions, and the like. In addition, the libraries 116 may include API libraries 136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 116 may also include a wide variety of other libraries 138 to provide many other APIs to the applications 120 and other software components/modules.

The frameworks 118 (also sometimes referred to as middleware) provides a higher-level common infrastructure that is utilized by the applications 120 or other software components/modules. For example, the frameworks 118 provide various graphic user interface (GUI) functions, high-level resource management, high-level location services, and so forth. The frameworks 118 provide a broad spectrum of other APIs that may be utilized by the applications 120 and/or other software components/modules, some of which may be specific to a particular operating system or platform.

The applications 120 include built-in applications 140 and/or third party applications 142. Examples of representative built-in applications 140 may include, but are not limited to, a contacts application, a browser application, a book reader application, a location application, a media application, a messaging application, or a game application. The third party applications 142 may include any of the built-in applications, as well as a broad assortment of other applications. In a specific example, the third party application 142 (e.g., an application developed using the Android™ or iOS™ software development kit (SDK) by an entity other than the vendor of the particular platform) is mobile software running on a mobile operating system such as iOS™, Android™, Windows® Phone, or other mobile operating systems. In this example, the third party application 142 invokes the API calls 124 provided by the mobile operating system such as the operating system 114 to facilitate functionality described herein.

The applications 120 may utilize built-in operating system functions (e.g., kernel 128, services 130, or drivers 132), libraries (e.g., system libraries 134, API libraries 136, or other libraries 138), or frameworks/middleware 118 to create user interfaces to interact with users of the system. Alternatively, or additionally, in some systems, interactions with a user may occur through a presentation layer, such as the presentation layer 144. In these systems, the application/module "logic" can be separated from the aspects of the application/module that interact with the user.

Some software architectures utilize virtual machines. In the example of FIG. 1, this is illustrated by a virtual machine 148. A virtual machine creates a software environment where applications/modules can execute as if they were executing on a hardware machine (e.g., the machine 900 of FIG. 9). The virtual machine is hosted by a host operating system (e.g., operating system 114) and typically, although not always, has a virtual machine monitor 146, which manages the operation of the virtual machine 148 as well as the interface with the host operating system (e.g., operating system 114). A software architecture executes within the virtual machine 148, such as an operating system 150, libraries 152, frameworks/middleware 154, applications 156, or a presentation layer 158. These layers of software architecture executing within the virtual machine 148 can be the same as corresponding layers previously described or may be different.

Figure 2:
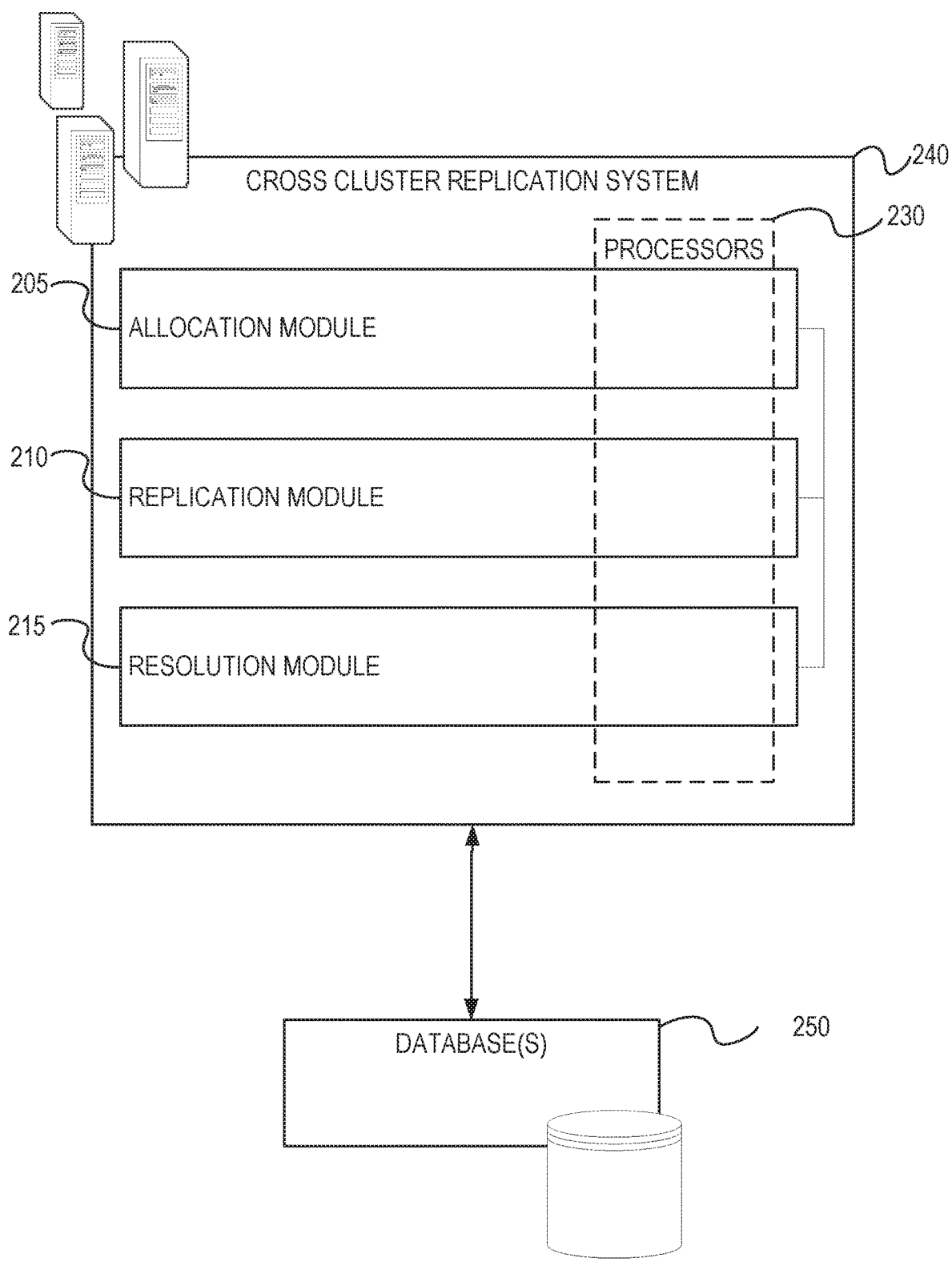
FIG. 2 is a block diagram illustrating various functional components of a cross-cluster replication system, which is provided as part of the networked system, according to example embodiments.

FIG. 2 is a block diagram illustrating components of a cross-cluster replication system 240 that provide functionality to allocate a cross-cluster member to a first cluster of nodes, receive key-values at a first leader member within the first cluster of nodes, replicate the key values to the cross-cluster member, submit the replicated key-value to a second leader member of a second cluster of nodes through the cross-cluster node, and replicate the replicated key-value to a second set of member nodes within the second cluster of nodes, according to certain example embodiments. The cross-cluster replication system 240 is shown as including an allocation module 205, a replication module 210, and a resolution module 215, all configured to communicate with each other (e.g., via a bus, shared memory, or a switch). Any one or more of these modules may be implemented using one or more processors 230 (e.g., by configuring such one or more processors to perform functions described for that module) and hence may include one or more of the processors 230.

Any one or more of the modules described may be implemented using dedicated hardware alone (e.g., one or more of the processors 230 of a machine) or a combination of hardware and software. For example, any module of the cross-cluster replication system 240 may physically include an arrangement of one or more of the processors 230 (e.g., a subset of or among the one or more processors of the machine) configured to perform the operations described herein for that module. As another example, any module of the cross-cluster replication system 240 may include software, hardware, or both, that configure an arrangement of one or more processors 230 (e.g., a subset of or among the one or more processors of the machine) to perform the operations described herein for that module. Accordingly, different modules of the cross-cluster replication system 240 may include and configure different arrangements of such processors 230 or a single arrangement of such processors 230 at different points in time. Moreover, any two or more modules of the cross-cluster replication system 240 may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some example embodiments, the cross-cluster replication system 240 is in communication with database(s) 250. For example, the cross-cluster replication system 240 communicates, provides access, or streams data to the database(s) 250.

Figure 3:
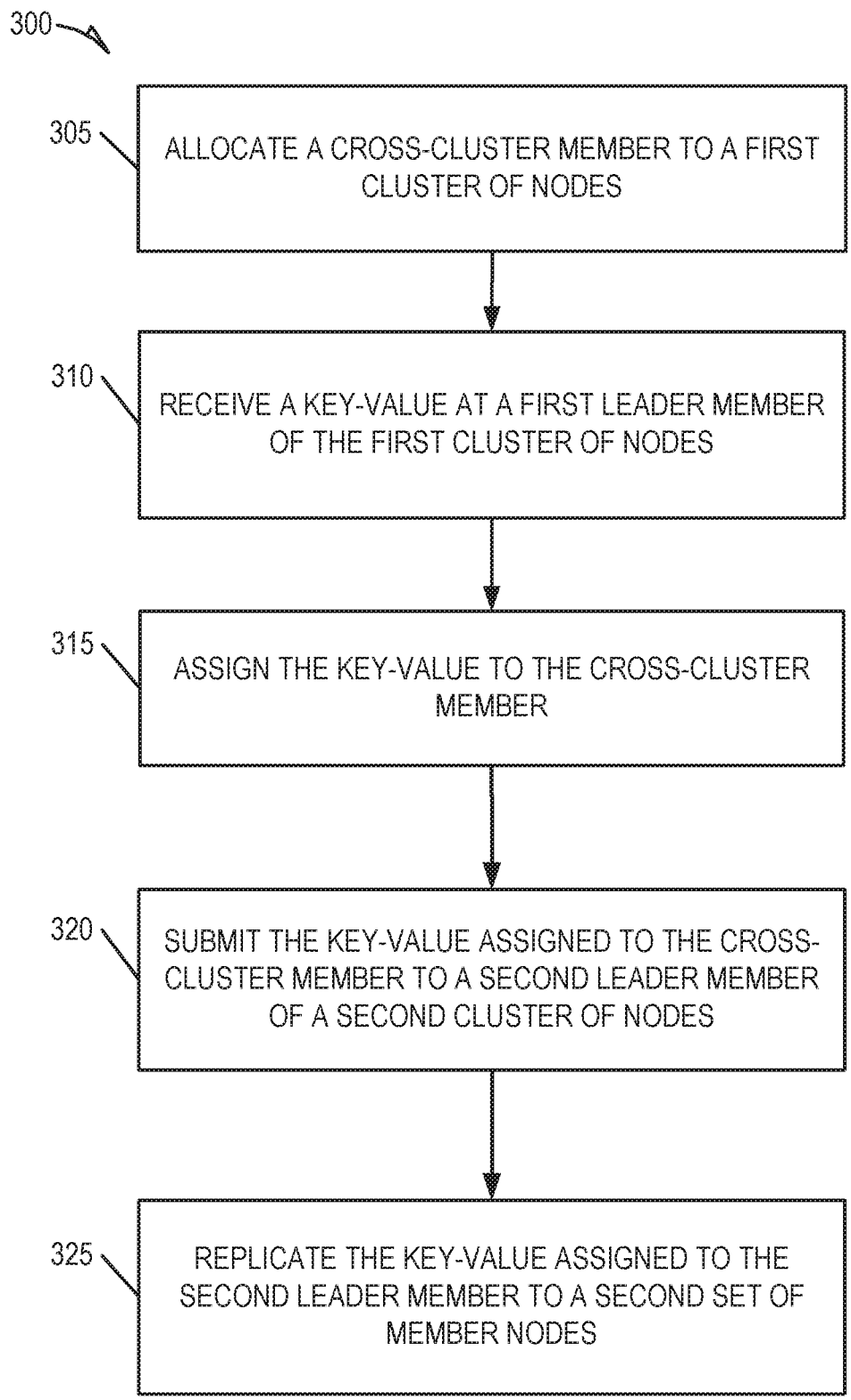
FIG. 3 is a flowchart illustrating a method for replicating a key-value to a cross-cluster member, according to an example embodiment.

FIG. 3 is a flowchart illustrating a method 300 for replicating a key-value to a cross-cluster member, according to an example embodiment. The method 300 may be embodied in computer-readable instructions for execution by one or more processors (e.g., processors 230 of FIG. 2) such that the steps of the method 300 are performed in part or in whole by functional components (e.g., modules) of a client device or the cross-cluster replication system 240; accordingly, the method 300 is described below by way of example with reference thereto. However, it shall be appreciated that the method 300 may be deployed on various other hardware configurations and is not intended to be limited to the functional components of the client device or the cross-cluster replication system 240.

At operation 305, the allocation module 205 allocates a cross-cluster member to a first cluster of nodes. In some embodiments, the cross-cluster member is local to the first cluster of nodes, and the local cross-cluster member replicates operations received at the local cluster (e.g., the first cluster of nodes) to a remote cluster (e.g., a second cluster of nodes). In further embodiments, the allocation module 205 allocates a cross-cluster member for the first cluster of nodes remotely, within one or more remote clusters, such that the remote cross-cluster member replicates operations received at the first cluster of nodes to the one or more remote clusters.

At operation 310, a first leader member of the first cluster of nodes receives a key-value operation (e.g., an upsert or a delete), and in response, at operation 315, the replication module 210 assigns the key-value operation to the cross-cluster member. For example, the key-value operation may be received as an input to the cross-cluster replication system 240 from a client device, or in some embodiments from another cross-cluster member of a remote cluster of nodes. In response to the first leader member of the first cluster of nodes receiving the key-value operation, the cross-cluster, learner only member within the cluster of nodes may automatically replicate the key-value operation.

Figure 4:
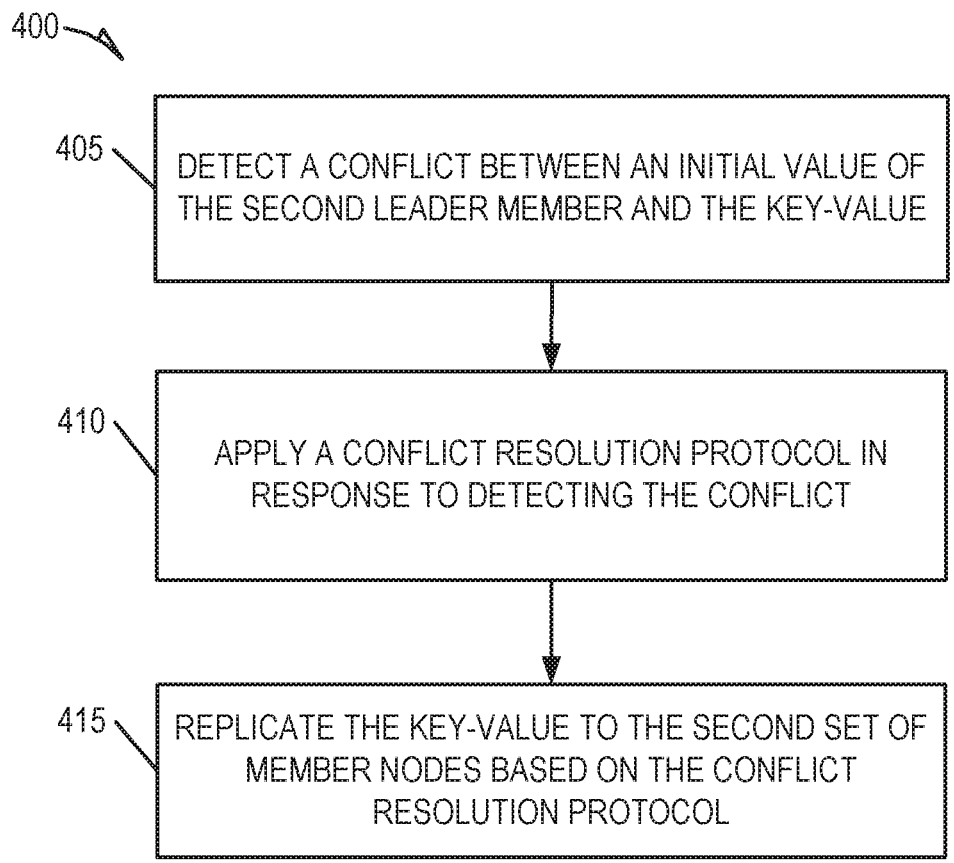
FIG. 4 is a flowchart illustrating a method for replicating a key-value to a cross-cluster member through a conflict resolution protocol, according to an example embodiment.

At operation 320, the cross-cluster member submits the key-value operation to a second leader member of a second cluster of nodes, wherein the second cluster of nodes is a remote cluster of nodes. In response to submitting the key-value operation to the second leader member of the second cluster of nodes, the resolution module 215 checks for conflicts between the key-value operation and an initial value of the second leader member of the second cluster of nodes. If no conflicts exist, at operation 325, the second leader member replicates the key-value operation to the second cluster of nodes. FIG. 4 discusses embodiments when a conflict is detected.

FIG. 4 is a flowchart illustrating a method 400 for replicating a key-value to a cross-cluster member through a conflict resolution protocol, according to an example embodiment. The method 400 may be embodied in computer-readable instructions for execution by one or more processors (e.g., processors 230 of FIG. 2) such that the steps of the method 400 may be performed in part or in whole by functional components (e.g., modules) of a client device or the cross-cluster replication system 240; accordingly, the method 400 is described below by way of example with reference thereto. The method 400 may be performed as a subroutine or subsequent to the method 300, in which the cross-cluster replication system 240 replicates a key-value operation from a cross-cluster member to a second leader member of a second cluster of nodes, according to an example embodiment.

At operation 405, the resolution module 215 detects a conflict between an initial value of a leader member (e.g., the first leader member of the first cluster, or the second leader member of the second cluster) and a key-value operation. For example, in response to receiving or submitting a key-value to a leader member, as in operations 310 or 320 of the method 300, the resolution module 215 determines that an initial value of the leader member conflicts with the key-value operation. In some embodiments, a conflict may occur when two or more key-value operations are executed out of order. For example, to detect a conflict, timestamps may be utilized such that when a first key-value has a timestamp of TS_1, and an incoming, second key-value operation has a timestamp of TS_2, and an evaluation of TS_1 and TS_2 shows that TS_1 is more recent than TS_2, then a conflict is detected. In such a case, if the values of the first and second key-values are the same, then there is no real conflict. In some embodiments, a version number may be utilized instead of timestamps, wherein the version number indicates a sequence of the corresponding key-value among a set of key-values.

At operation 410, in response to detecting the conflict between the initial value and the key-value operation, the resolution module 215 employs a conflict resolution protocol to identify a winner between the initial value and the key-value operation. In some embodiments, the conflict resolution protocol includes a "last-write-wins" protocol, wherein a most recent value is deemed the "winner," and replicated to a set of member nodes.

At operation 415, upon determining a winner between the initial value and the key-value operation, the winning value (e.g., the key-value operation) is replicated to the leader member, which then replicates the winning value to a set of member nodes within the cluster of nodes.

Figure 5:
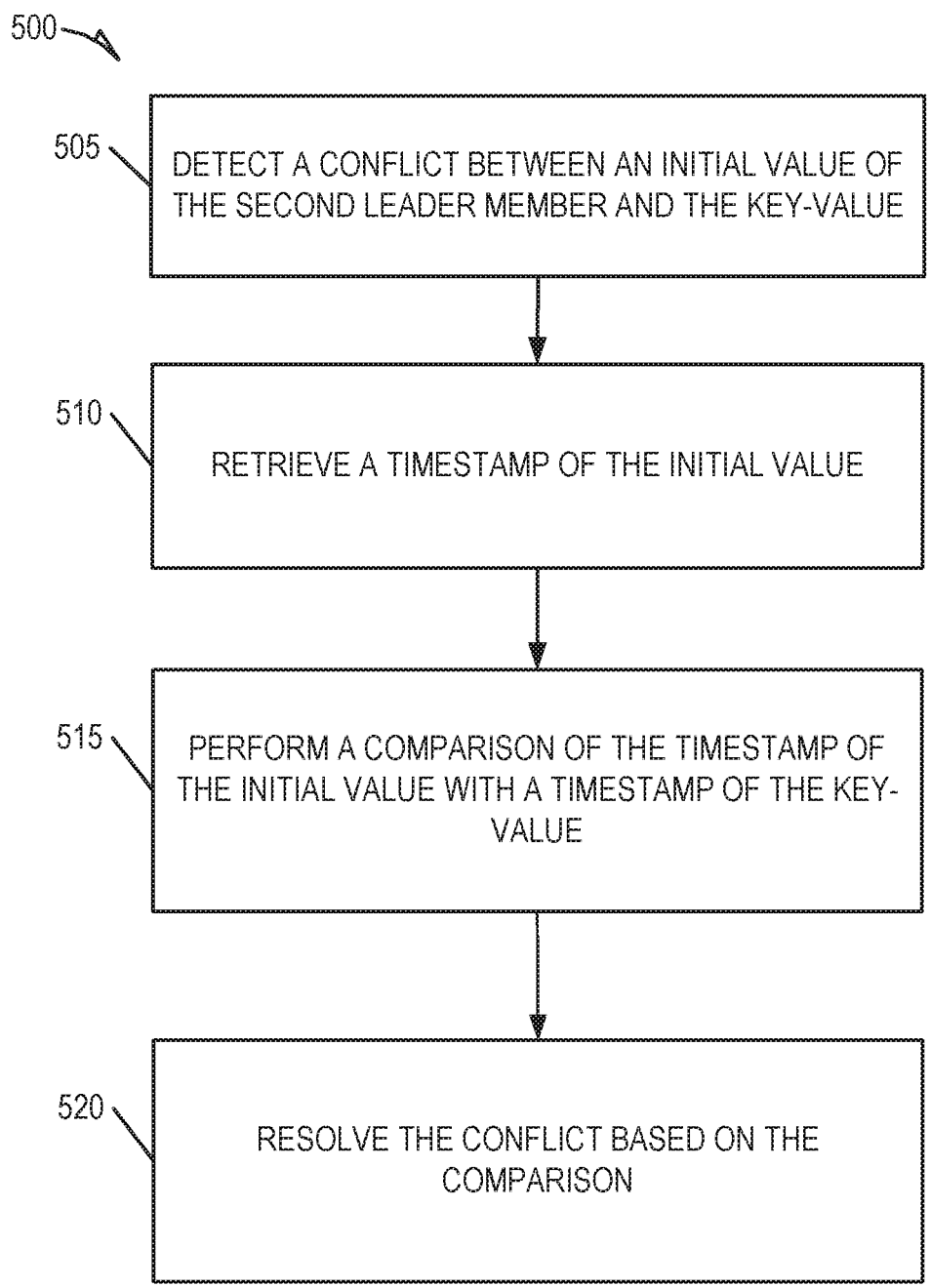
FIG. 5 is a flowchart illustrating a method for replicating a key-value to a cross-cluster member through a conflict resolution protocol, according to an example embodiment.

FIG. 5 is a flowchart illustrating a method 500 for replicating a key-value to a cross-cluster member through a conflict resolution protocol, according to an example embodiment. The method 500 may be embodied in computer-readable instructions for execution by one or more processors (e.g., processors 230 of FIG. 2) such that the steps of the method 500 may be performed in part or in whole by functional components (e.g., modules) the cross-cluster replication system 240; accordingly, the method 500 is described below by way of example with reference thereto. The method 500 may be performed as a subroutine or subsequent to the operations of the method 300, according to an example embodiment.

At operation 505, the replication module 210 detects a conflict between an initial value of a leader member of a cluster of nodes (e.g., the second leader member described in the operation 320 of the method 300). The second leader member may include an initial value that comprises a value and a timestamp, wherein the timestamp indicates a time in which the initial value was received by the second leader member.

In some embodiments, the replication module 210 detects the conflict between the initial value and a key-value in response to submitting the key-value to the second leader member. For example, the process of submitting the key-value to the second leader member may include first checking a value of the second leader member, and comparing the initial value to the key-value to determine if there is a conflict.

At operation 510, in response to detecting the conflict between the initial value and the key-value, the resolution module 215 retrieves a timestamp associated with the initial value, wherein the timestamp indicates a time in which the initial value was received by the second leader member. In some embodiments, the timestamp may include an indication of a sequence in which the initial value was received.

At operation 515, the resolution module 215 performs a comparison between the timestamp of the initial value and a timestamp of the key-value to determine which value is the most recent.

At operation 520, the resolution module 215 identifies a winning value between the initial value and the key-value based on the corresponding timestamps, and updates the second leader member with the winning value.

In some embodiments, upon determining that the initial value is more recent than the key-value submitted by the cross-cluster member, the resolution module 215 ignores the submitted key-value. In further embodiments, in response to the determining that the initial value is more recent than the key-value submitted by the cross-cluster member, the second leader member replicates the submitted value to its cluster, and allows the other members of the cluster to perform conflict detection and resolution. Thus, a "state machine" of every member of the cluster checks for conflicts and determines the appropriate actions consistently with the cluster and across the clusters.

Figure 6:
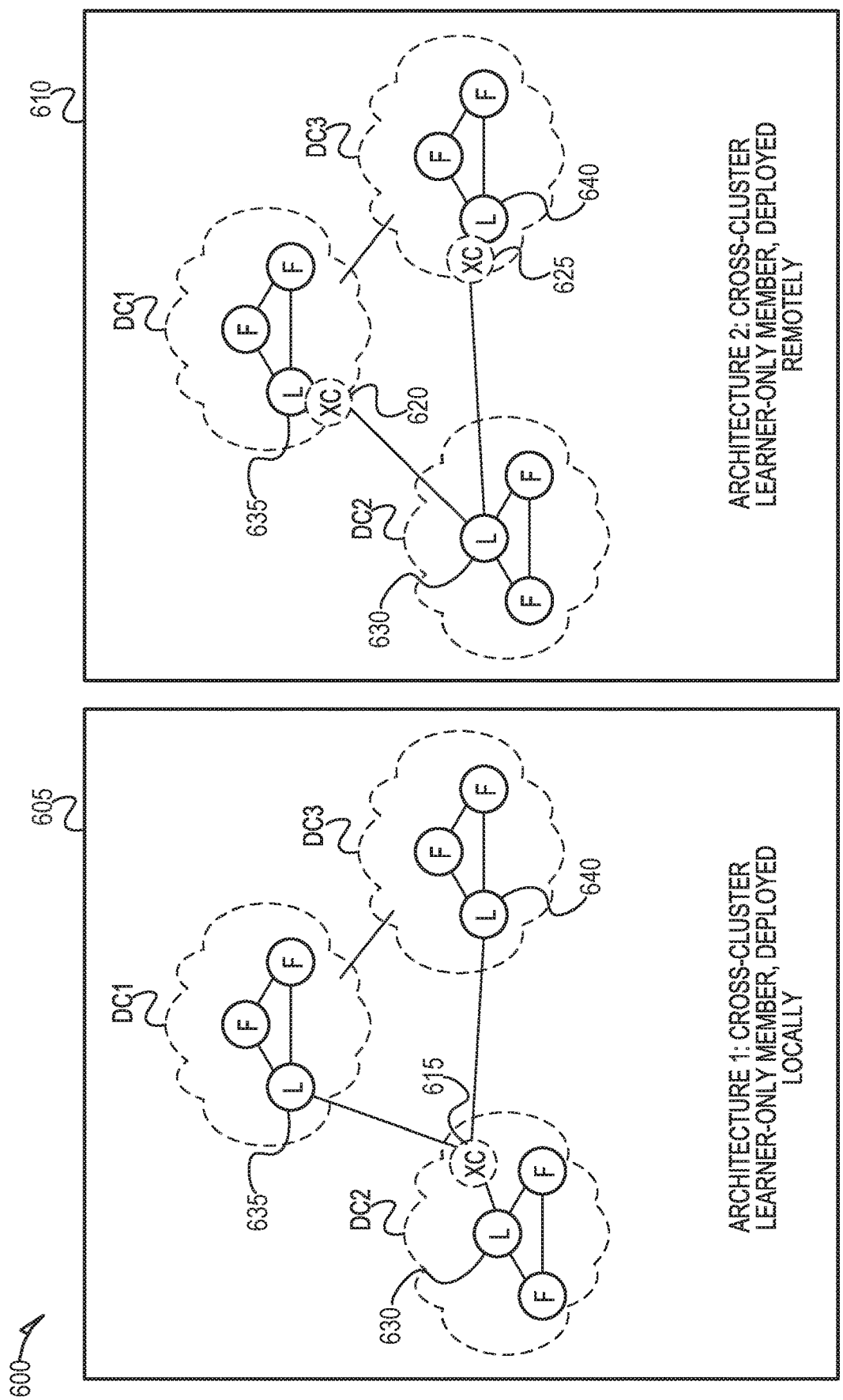
FIG. 6 is a diagram illustrating architectures of a cross-cluster replication system, according to certain example embodiments.

FIG. 6 is a diagram 600 illustrating architectures of the cross-cluster replication system 240, according to certain example embodiments. The diagrams 600 include a first architecture 605 and a second architecture 610.

The diagram 600 illustrates two ways of deploying learner-only, cross-cluster members (e.g., cross-cluster members 615, 620, and 625) for a data center (e.g., cluster DC2) in a three-data center configuration (e.g., duster DC1, cluster DC2, and cluster DC3).

According to the first architecture 605, an embodiment is to host the cross-cluster member 615 within the local cluster (e.g., cluster DC2). In such embodiments, the cross-cluster member 615 receives key-values written to the local leader member 630, and submit the key-values to the remote leader members 635 and 640 of the cluster DC1 and DC3. In some embodiments, clusters DC1 and DC3 may also include non-voting, cross-cluster members (not shown).

According to the second architecture 610, an embodiment is to host cross-cluster members 620 and 625 associated with the cluster DC2 remotely within the clusters DC1 and DC3, wherein the cross-cluster members 620 and 625 function to submit values received at the leader member 630 of the cluster DC2 to the leader members 635 and 640 of the clusters DC1 and DC3. As seen in the second architecture 610, the cross-cluster members 620 and 625 may be allocated to the cluster DC2 by linking the cross-cluster member 620 and 625 to the leader member 630 within the cluster DC2.

Figure 7:
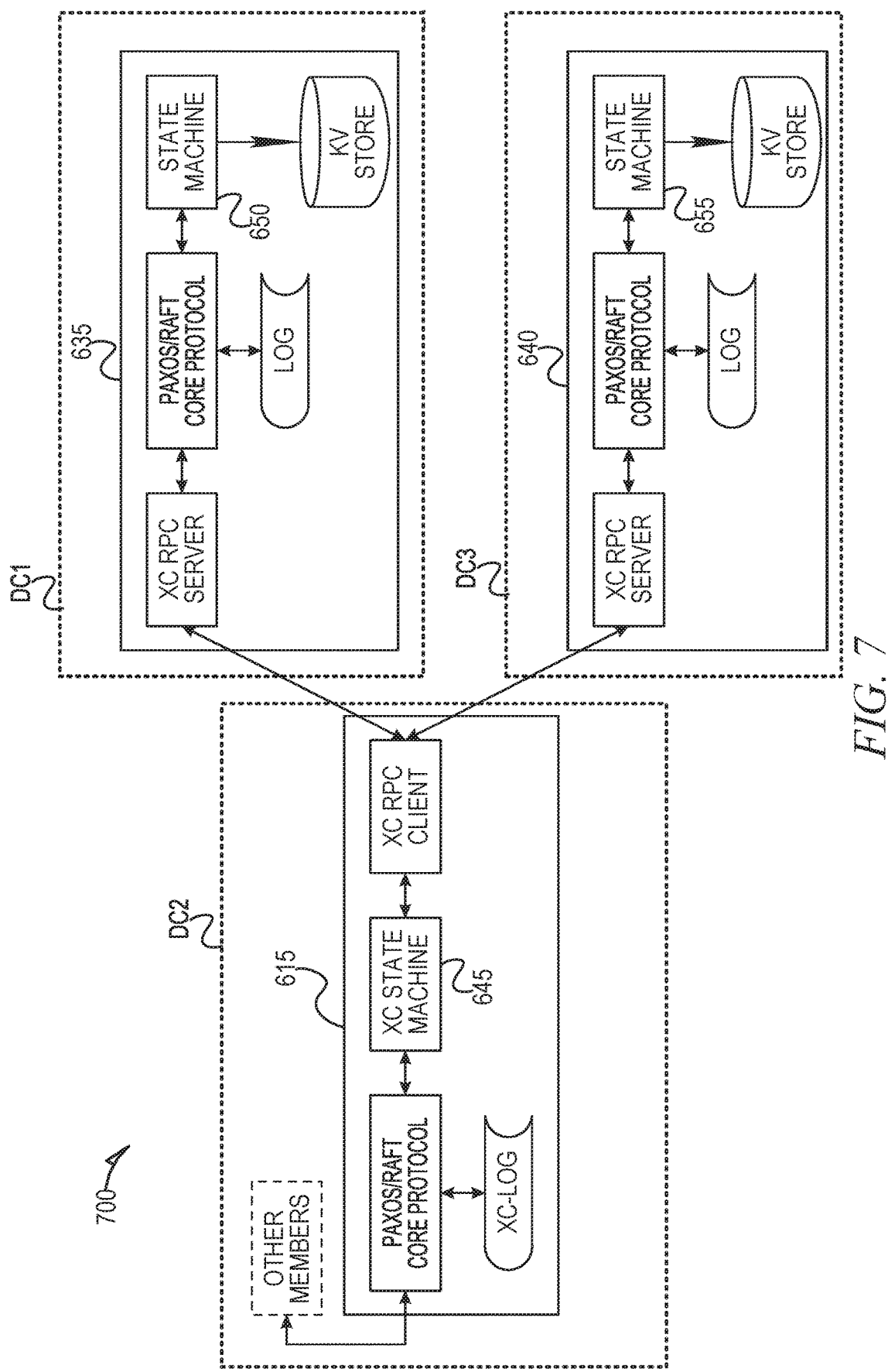
FIG. 7 is a diagram illustrating an embodiment of a cross-cluster replication system, according to an example embodiment.

FIG. 7 is a diagram 700 illustrating an embodiment of a cross-cluster replication system (e.g., the cross-cluster replication system 240), according to an example embodiment. As seen in the diagram 700, the cross-cluster member 615 (as seen in the diagram 600 of FIG. 6), is configured as learner only member of the cluster DC2, with a consensus protocol such as multi-Paxos or Raft.

To submit a key-value to either the leader member 635 of the cluster DC1 or the leader member 640 of the cluster DC3, the cross-cluster member 615 connects to any member node of a given cluster (e.g., cluster DC1 or cluster DC3) by using a handshake message (e.g., getmaster) to find the corresponding leader member of the given cluster. In further embodiments, any member node of a given cluster may accept submissions from the cross-cluster member 615 and forward the submission to their own local leader for replication.

When a leader member, such as leader member 630, receives a key-value operation from a client, the leader member assigns a unique cluster identifier (e.g., duster DC2) to the key-value operation, as well as a timestamp from a clock (e.g., a hybrid logical clock). It then replicates the key-value operation to its local cluster members. The cross-cluster member forwards the key-value operation to remote leaders (e.g. leader member 635 or leader member 640). The leader member then replicates to its local cluster.

Each state machine (e.g., state machine 650, 655) checks for conflicts and resolves the conflicts based on one or more protocols and rules, such as a comparison of timestamps.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of implementing a replicated key value store using a consensus protocol, the method comprising:
    allocating, by one or more processors, a cross-cluster member to a cluster of nodes, the cluster of nodes comprising a first set of member nodes and a first leader member, the first leader member configured to receive key-values;
    receiving a key-value at the first leader member of the cluster of nodes, the key-value including a timestamp;
    replicating the key-value to the cross-cluster member in response to the receiving the key-value at the first leader member of the cluster of nodes;
    submitting the key-value assigned to the cross-cluster member to a second leader member of a remote cluster of nodes, the remote cluster of nodes comprising a second set of member nodes; and
    replicating the key-value assigned to the second leader member to the second set of member nodes.

2. The method of claim 1, wherein the cross-cluster member is a learner-only member of the cluster of nodes.

3. The method of claim 1, wherein the allocating the cross-cluster member to the cluster of nodes includes:
    adding the cross-cluster member locally to the cluster of nodes.

4. The method of claim 1, wherein the allocating the cross-cluster member to the cluster of nodes includes:
    adding the cross-cluster member to the remote cluster of nodes; and
    linking the cross-cluster member to the cluster of nodes.

5. The method of claim 1, wherein the second leader member of the remote cluster of nodes comprises an initial value, and the replicating the key-value to the second set of member nodes further comprises:
    detecting a conflict between the initial value and the key-value;
    applying a conflict resolution protocol in response to the detecting the conflict; and
    resolving the conflict based on the conflict resolution protocol, wherein the replicating the key-value to the second set of member nodes is in response to the resolving the conflict.

6. The method of claim 5, wherein the initial value of the second leader member includes an initial timestamp, and the resolving the conflict includes:
    performing a comparison of the initial timestamp to the timestamp of the key-value, wherein the resolving the conflict is based on the comparison.

7. A system comprising:
    one or more processors; and
    a memory storing instructions that configure the one or more processors to perform operations comprising:
        allocating a cross-cluster member to a cluster of nodes, the cluster of nodes comprising a first set of member nodes and a first leader member, the first leader member configured to receive key-values;
        receiving a key-value at the first leader member of the cluster of nodes, the key-value including a timestamp;

replicating the key-value to the cross-cluster member in response to the receiving the key-value at the first leader member of the cluster of nodes;

submitting the key-value assigned to the cross-cluster member to a second leader member of a remote cluster of nodes, the remote cluster of nodes comprising a second set of member nodes; and replicating the key-value assigned to the second leader member to the second set of member nodes.

8. The system of claim 7, wherein the cross-cluster member is a learner only member of the cluster of nodes.

9. The system of claim 7, wherein allocating the cross-cluster member to the cluster of nodes includes:

adding the cross-cluster member locally to the cluster of nodes.

10. The system of claim 7, wherein the allocating the cross-cluster member to the cluster of nodes includes:

adding the cross-cluster member to the remote cluster of nodes; and linking the cross-cluster member to the cluster of nodes.

11. The system of claim 7, wherein the second leader member of the remote cluster of nodes comprises an initial value, and the replicating the key-value to the second set of member nodes further comprises:

detecting a conflict between the initial value and the key-value;

applying a conflict resolution protocol in response to the detecting the conflict; and resolving the conflict based on the conflict resolution protocol, wherein the replicating the key-value to the second set of member nodes is in response to the resolving the conflict.

12. The system of claim 7, wherein the initial value of the second leader member includes an initial timestamp, and the resolving the conflict includes:

performing a comparison of the initial timestamp to the timestamp of the key-value, wherein the resolving the conflict is based on the comparison.

13. A non-transitory machine-readable storage medium including instructions that, when executed by a machine, cause the machine to perform operations comprising:

allocating a cross-cluster member to a cluster of nodes, the cluster of nodes comprising a first set of member nodes and a first leader member, the first leader member configured to receive key-values;

receiving a key-value at the first leader member of the cluster of nodes, the key-value including a timestamp;

replicating the key-value to the cross-cluster member in response to the receiving the key-value at the first leader member of the cluster of nodes;

submitting the key-value assigned to the cross-cluster member to a second leader member of a remote cluster of nodes, the remote cluster of nodes comprising a second set of member nodes, wherein the cross-cluster member submits the key-value to the second leader member; and causing the key-value assigned to the second leader member to be replicated to the second set of member nodes.

14. The non-transitory machine-readable storage medium of claim 13, wherein the allocating the cross-cluster member to the cluster of nodes includes:

adding the cross-cluster member locally to the cluster of nodes.

15. The non-transitory machine-readable storage medium of claim 13, wherein the allocating the cross-cluster member to the cluster of nodes includes:

adding the cross-cluster member to the remote cluster of nodes; and linking the cross-cluster member to the cluster of nodes.

16. The non-transitory machine-readable storage medium of claim 13, wherein the cluster of nodes comprises at least three nodes that include the leader member and at least two learner members.

17. The non-transitory machine-readable storage medium of claim 13, wherein the second leader member of the remote cluster of nodes comprises an initial value, and the replicating the key-value to the second set of member nodes further comprises:

detecting a conflict between the initial value and the key-value;

applying a conflict resolution protocol in response to the detecting the conflict; and resolving the conflict based on the conflict resolution protocol, wherein the replicating the key-value to the second set of member nodes is in response to the resolving the conflict.

18. The method of claim 1, wherein the cross-cluster member is not one of the first set of member nodes or the first leader member, and wherein the cross-cluster member receives the replicated key-value from the first leader member.

19. The method of claim 1, wherein the key-value is received as part of a key-value operation, wherein the cross-cluster member and the first set of member nodes receive the key-value operation from the first leader member, and wherein the key-value is submitted to the second leader member of the remote cluster of nodes by the cross-cluster member forwarding the key-value operation to the second leader member.

20. The method of claim 19, wherein the first leader member stores, in the key-value operation, a unique cluster identifier associated with the cluster of nodes.

* * * * *